(12) United States Patent
Hotta et al.

(10) Patent No.: US 7,771,675 B2
(45) Date of Patent: Aug. 10, 2010

(54) FUEL SUPPLY DEVICE FOR INTERNAL COMBUSTION AND CONTROL METHOD THEREFOR

(75) Inventors: Isamu Hotta, Yokohama (JP); Masaaki Kubo, Yokohama (JP); Eiji Takahashi, Yokosuka (JP); Koichi Ashida, Yokohama (JP); Yasushi Sekine, 4-7-A201, Kasuga-cho 3-chome, Nerima-ku, Tokyo (JP) 179-0074

(73) Assignees: Nissan Motor Co., Ltd., Yokohama-shi (JP); Yasushi Sekine, Tokyo (JP)

( * ) Notice: Subject to any disclaimer, the term of this patent is extended or adjusted under 35 U.S.C. 154(b) by 764 days.

(21) Appl. No.: 11/700,757

(22) Filed: Feb. 21, 2007

(65) Prior Publication Data

US 2007/0183939 A1 Aug. 9, 2007

(30) Foreign Application Priority Data

Feb. 6, 2006 (JP) .............................. 2006-028634
Feb. 6, 2006 (JP) .............................. 2006-028635

(51) Int. Cl.
*B01J 8/02* (2006.01)
*F02B 7/00* (2006.01)
(52) U.S. Cl. .................... 422/211; 422/108; 123/577
(58) Field of Classification Search ................ 123/209, 123/253, 557; 422/109, 110, 211
See application file for complete search history.

(56) References Cited

U.S. PATENT DOCUMENTS

| 3,546,102 | A  | * | 12/1970 | Bertolacini ............. 208/138 |
| 6,318,306 | B1 | * | 11/2001 | Komatsu ................. 123/3 |
| 6,739,289 | B2 | * | 5/2004  | Hiltner et al. ........... 123/3 |
| 7,174,861 | B2 | * | 2/2007  | Allston et al. ........... 123/1 A |

FOREIGN PATENT DOCUMENTS

JP     2000-291499 A    10/2000

* cited by examiner

*Primary Examiner*—Walter D Griffin
*Assistant Examiner*—Timothy Cleveland
(74) *Attorney, Agent, or Firm*—Foley & Lardner LLP

(57) ABSTRACT

A reforming catalyst (6) induces an isomerization reforming reaction and a decomposition reforming reaction of a gasoline fuel. Injectors (27, 33, 35, 36) supply an isomerized fuel generated by the isomerization reforming reaction and a decomposed fuel generated by the decomposition reforming reaction respectively to the internal combustion engine (1). The ratio of the isomerization reforming reaction and the decomposition reforming reaction depends on a catalyst temperature, and can be altered arbitrarily by controlling an air supply amount to the catalyst (6) via an air amount regulating valve (14) and a fuel supply amount to the catalyst (6) via a fuel injector (8) and thereby controlling the catalyst temperature.

33 Claims, 13 Drawing Sheets

7 MAIN FUEL STORAGE TANK
10 FUEL PUMP
12 CONDENSER
17 RADIATOR
21 DECOMPOSED FUEL STORAGE TANK
23 COMPRESSOR
25 MAIN FUEL SUPPLY PUMP
28 LEVEL SENSOR
29 LEVEL SENSOR
30 ISOMERIZED FUEL PUMP
34 PRESSURE SENSOR

FUEL SUPPLY DEVICE FOR INTERNAL COMBUSTION AND CONTROL METHOD THEREFOR

FIELD OF THE INVENTION

This invention relates to the reforming of a gasoline fuel supplied to an internal combustion engine.

BACKGROUND OF THE INVENTION

JP2000-291499A, published by the Japan Patent Office in 2000 proposes a fuel supply device which reforms a gasoline fuel before supplying it to an internal combustion engine. The device extracts a reformate gas containing hydrogen and carbon monoxide by causing a partial oxidation reforming reaction and a steam reforming reaction in the gasoline fuel. The residual fuel which has not undergone the reforming reaction is a high-octane-number fuel which has a relatively small molecular mass.

The reformate gas has a high combustion speed and brings about an effect of ensuring that the ignition of a fuel-air mixture, and hence the stability of combustion, is enhanced in a state where the internal combustion engine performs a lean burn operation.

In contrast, the high-octane-number fuel prevents knocking from occurring in the internal combustion engine, which results in an increase in the output torque and the heat efficiency of the internal combustion engine.

SUMMARY OF THE INVENTION

In the prior art device, the high-octane-number fuel is obtained as a by-product of the partial oxidation reforming reaction and the steam reforming reaction for extracting the reformate gas containing hydrogen and carbon monoxide. It is therefore not possible to generate only the high-octane-number fuel without causing a reforming reaction. As a result, the amount of the high-octane-number fuel may be less than required.

On the other hand, the reformate fuel obtained through the partial oxidation reforming reaction and the steam reforming reaction contains, other than hydrogen and carbon monoxide, about 50% of nitrogen which is an inert gas. Nitrogen is an agent that dilutes fuel, and hence adversely affects the stability of combustion.

It is therefore an object of this invention to enable an arbitrary alteration of the generation ratio of the high combustion speed fuel and the high-octane-number fuel.

It is a further object of this invention to reduce the nitrogen content of the high combustion speed fuel.

In order to achieve the above objects, the inventors focused attention on an isomerization reforming reaction and a decomposition reforming reaction of a gasoline fuel represented by the following relations:

Isomerization reforming reaction:

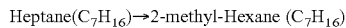

Decomposition reforming reaction:

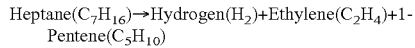

The isomerization reforming reaction generates an isomerized fuel with a high-octane-number, whereas the decomposition reforming reaction generates a decomposed fuel which has a high combustion speed. Since these reforming reactions do not require oxygen, the nitrogen content in the resultant products can be suppressed to be small.

Based on these observations, this invention provides a fuel supply device for supplying fuel to an internal combustion engine, comprising a reforming catalyst which induces an isomerization reforming reaction and a decomposition reforming reaction of a source fuel at a different reaction ratio depending on a catalyst temperature of the reforming catalyst, a catalyst temperature varying mechanism which varies the catalyst temperature, a fuel supply mechanism which supplies an isomerized fuel generated by the isomerization reforming reaction and a decomposed fuel generated by the decomposition reforming reaction respectively to the internal combustion engine, and a programmable controller which controls the catalyst temperature varying mechanism.

The controller is programmed to determine whether a request for increasing a reaction ratio of the isomerization reforming reaction exists, and control the catalyst temperature varying mechanism to lower the catalyst temperature below a predetermined temperature, when the request for increasing the reaction ratio of the isomerization reforming reaction has been determined to exist.

The controller is also programmed to determine whether a request for increasing a reaction ratio of the decomposition reforming reaction exists, and control the catalyst temperature varying mechanism to raise the catalyst temperature above the predetermined temperature when the request for increasing the reaction ratio of the decomposition reforming reaction has been determined to exist.

This invention also provides a control method for a fuel supply device comprising a reforming catalyst which induces an isomerization reforming reaction and a decomposition reforming reaction of a source fuel at a different reaction ratio depending on a catalyst temperature of the reforming catalyst, a catalyst temperature varying mechanism which varies the catalyst temperature, and a fuel supply mechanism which supplies an isomerized fuel generated by the isomerization reforming reaction and a decomposed fuel generated by the decomposition reforming reaction respectively to an internal combustion engine.

The method comprises determining whether a request for increasing a reaction ratio of the isomerization reforming reaction exists, controlling the catalyst temperature varying mechanism to lower the catalyst temperature below a predetermined temperature, when the request for increasing the reaction ratio of the isomerization reforming reaction has been determined to exist, determining whether a request for increasing a reaction ratio of the decomposition reforming reaction exists, and controlling the catalyst temperature varying mechanism to raise the catalyst temperature above the predetermined temperature when the request for increasing the reaction ratio of the decomposition reforming reaction has been determined to exist.

The details as well as other features and advantages of this invention are set forth in the remainder of the specification and are shown in the accompanying drawings.

DESCRIPTION OF THE PREFERRED EMBODIMENTS

Figure 1:
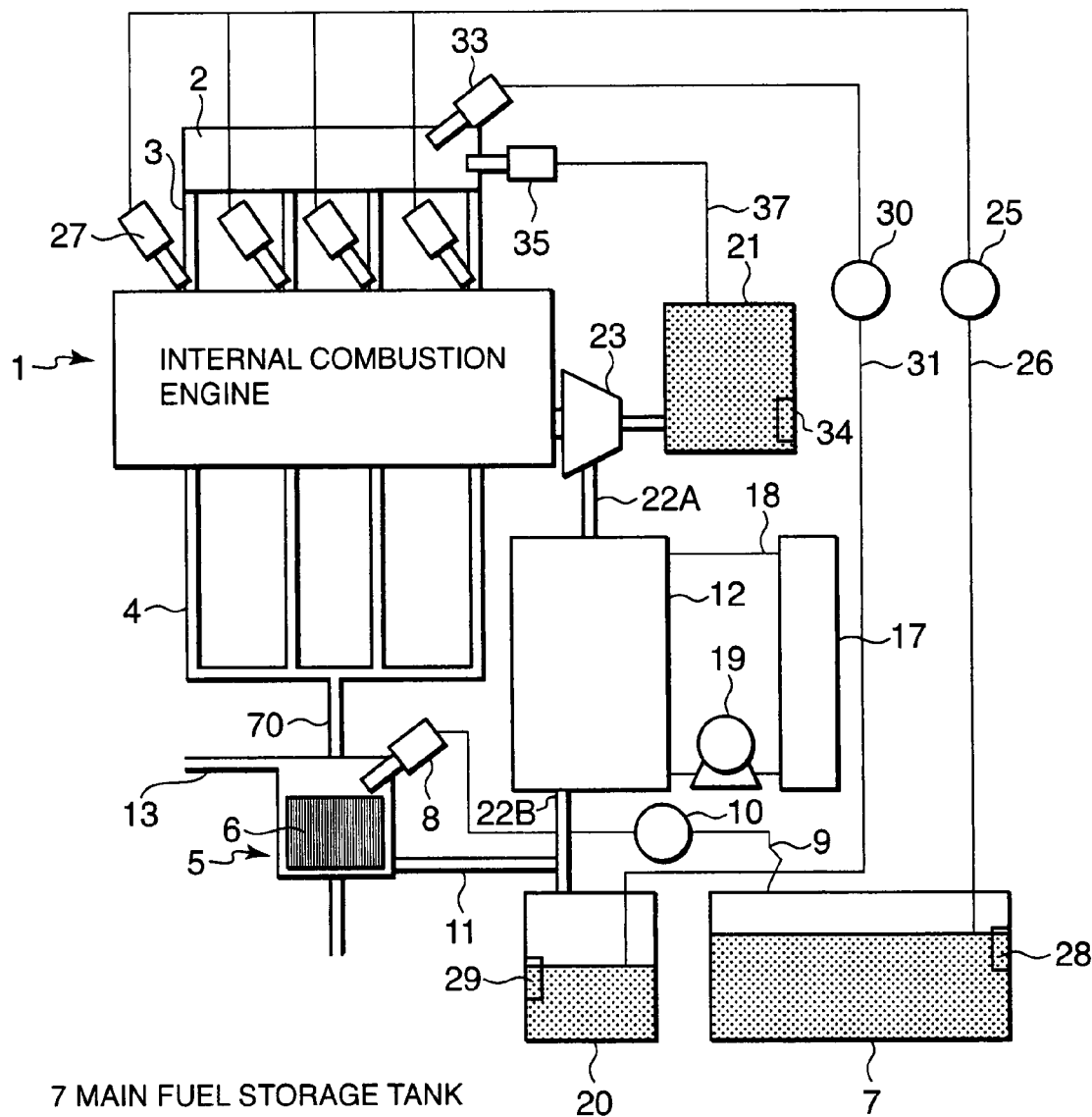
FIG. 1 is a schematic diagram of a fuel supply device according to this invention.

Referring to FIG. 1 of the drawings, a fuel supply device for a four-stroke cycle internal combustion engine 1 for a vehicle comprises a fuel reforming system which reforms a gasoline fuel stored in a main fuel storage tank 7 and a fuel supply system which supplies various kinds of fuels to the internal combustion engine 1.

The fuel reforming system reforms a gasoline fuel in the main fuel storage tank 7 using a catalytic converter 5 and a condenser 12. A reforming catalyst 6 is housed in the catalytic converter 5. In the catalytic converter 5, the gasoline fuel is reformed through an isomerization reforming reaction and a decomposition reforming reaction, which are represented by the following molecular formulae.

Isomerization reforming reaction:

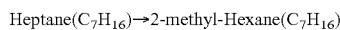

Heptane($C_7H_{16}$)→2-methyl-Hexane($C_7H_{16}$)

Decomposition reforming reaction:

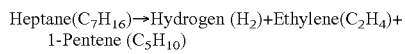

Heptane($C_7H_{16}$)→Hydrogen ($H_2$)+Ethylene($C_2H_4$)+ 1-Pentene ($C_5H_{10}$)

The isomerization reforming reaction is a reaction which does not bring any change in the molecular formula of the fuel, but reforms it into an isomer compound. The decomposition reforming reaction is a reaction which converts a fuel component of a large molecular weight into a fuel component of a small molecular weight as a result of vaporization of the fuel under the heat of the reforming catalyst 6. These reactions are different from the partial oxidation reforming reaction and the steam reforming reaction performed in the aforesaid prior art device.

Figure 2:
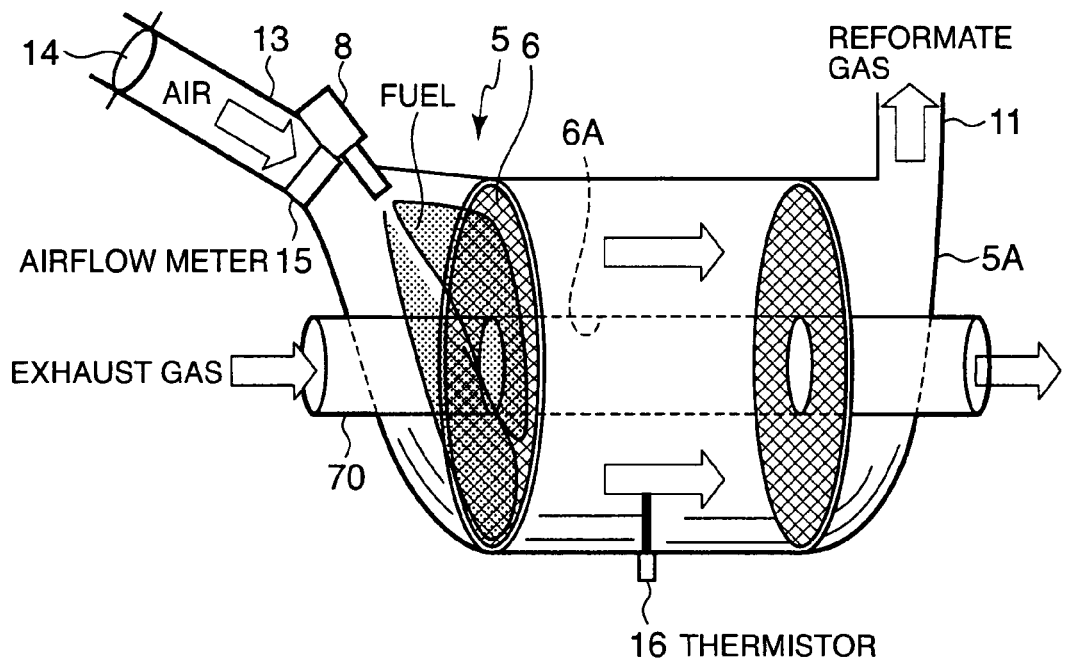
FIG. 2 is a perspective view of the interior of a catalytic converter which is a component of the fuel supply device.

Referring to FIG. 2, the reforming catalyst 6 is supported on a honeycomb-shaped substrate accommodated in a housing 5A of the catalytic converter 5. The reforming catalyst 6 comprises beta-zeolite and platinum. However, the material for the reforming catalyst 6 should not be limited to this combination. Any catalytic material that induces the isomerization reforming reaction and the decomposition reforming reaction may be used as a material for the reforming catalyst 6.

The reforming catalyst 6 is formed into a cylindrical shape and a through-hole 6A is formed axially along a center line thereof. An exhaust pipe 70 of the internal combustion engine 1 is arranged to pass through the through-hole 6A such that the heat of exhaust gas is transmitted to the reforming catalyst 6 and activates the above reforming reactions.

The constitution of the catalytic converter 5 described above ensures an effective heat supply to the reforming catalyst 6 and causes the space around the exhaust pipe 70 in the vehicle to be utilized effectively for disposing the catalytic converter 5.

In the housing 5A, a fuel injector 8 for injecting gasoline fuel stored in the main fuel storage tank 7 towards the reforming catalyst 6 is disposed upstream of the reforming catalyst 6.

An air supply pipe 13 is connected to the catalytic converter 5. The air supply pipe 13 supplies air that has passed through an air cleaner provided in the vehicle, to a space upstream of the reforming catalyst 6. An air amount regulating valve 14 serving as an air amount regulator is disposed in the air supply pipe 13. The gasoline fuel injected from the fuel injector 8 is mixed with the air supplied from the air supply pipe 13 and supplied to the reforming catalyst in the form of a fuel-air mixture.

The reforming catalyst 6 induces the isomerization reforming reaction and the decomposition reforming reaction of the gasoline fuel under a reaction ratio that is dependent on the catalyst temperature thereof.

Figure 3:
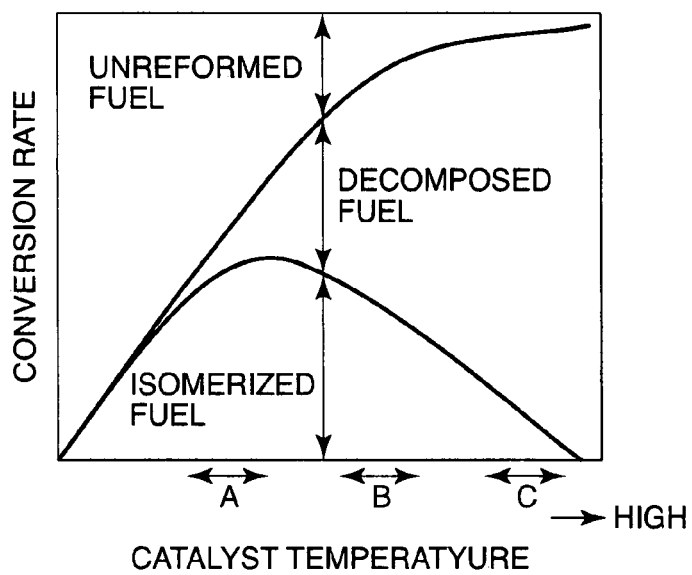
FIG. 3 is a diagram showing the relation between a temperature of a reforming catalyst in the catalytic converter and a conversion rate of fuel.

Referring to FIG. 3, the reforming catalyst 6 induces mainly the isomerization reforming reaction in a temperature region A, induces the isomerization reforming reaction and the decomposition reforming reaction in parallel in a temperature region B which is higher than the temperature region A, and induces mainly the decomposition reforming reaction in a temperature region C which is higher than the temperature region B. The temperature regions A, B, and C are set around 450 kelvin, 500 kelvin, and 550 kelvin, respectively.

Referring again to FIG. 1, the reformate gas generated by the reforming catalyst 6 flows into the condenser 12 via a reformate gas pipe 11. The condenser 12 separates the reformate gas into a fuel component generated by the decomposition reforming reaction and a fuel component generated by the isomerization reforming reaction. In the following description, the former is referred to as an isomerized fuel and the latter is referred to as a decomposed fuel.

Figure 4:
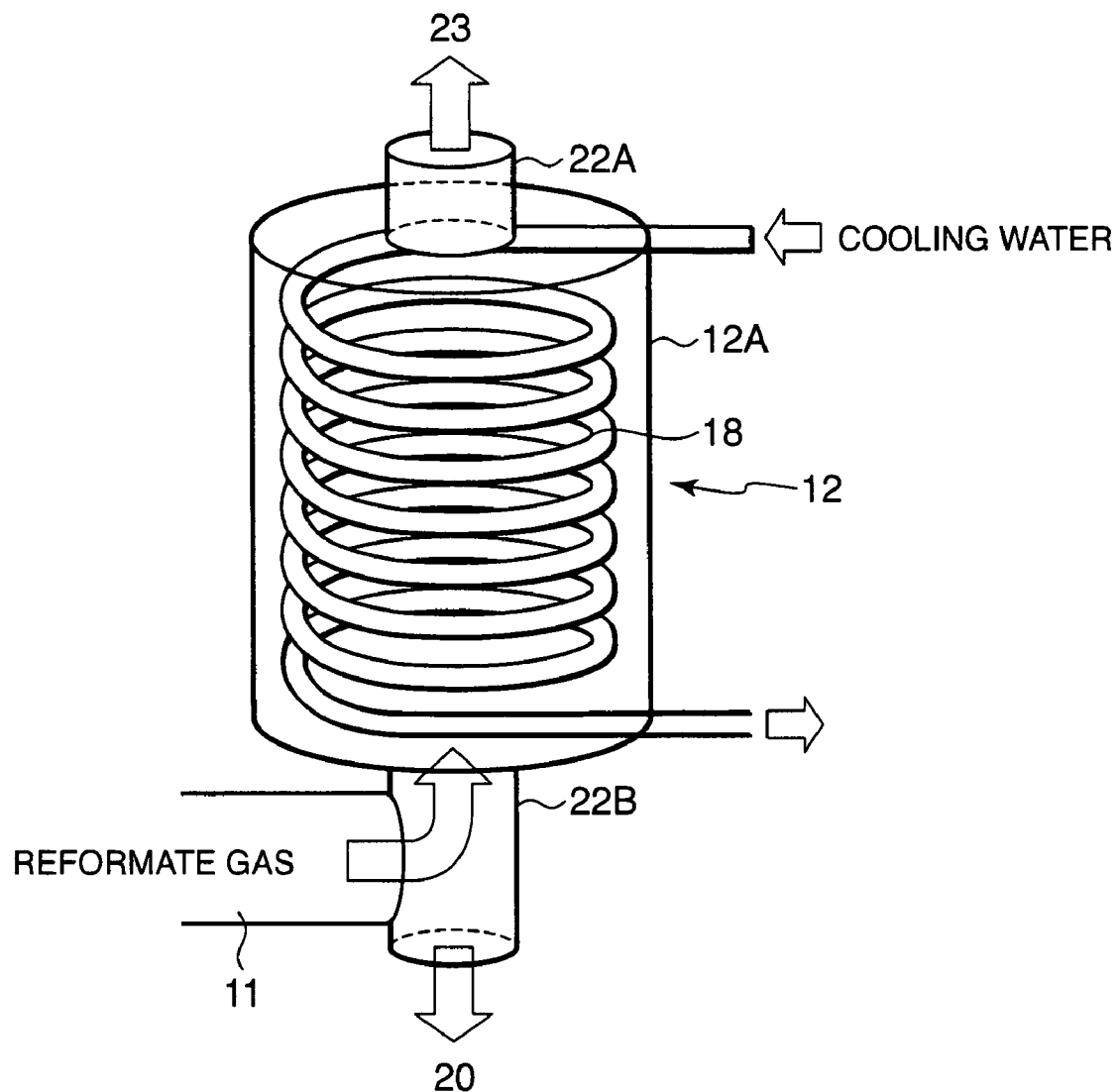
FIG. 4 is a perspective view of the interior of a condenser which is a component of the fuel supply device.

Referring to FIG. 4, the constitution of the condenser 12 will be described.

The condenser 12 connected to the reformate gas pipe 11 is disposed in a higher position than the reformate gas pipe 11. In a cylindrical housing 12A of the condenser 12, a cooling water pipe 18 is arranged along a helical path. The cooling water pipe 18 has an outlet and an inlet on the exterior of the cylindrical housing 12A. The cylindrical housing 12A is disposed such that its center axis coincides with the plumb line. A decomposed fuel pipe 22A is connected from above the upper end face of the cylindrical housing 12A. An isomerized fuel pipe 22B is connected from beneath the lower end face of the cylindrical housing 12A. The reformate gas pipe 11 is connected to the isomerized fuel pipe 22B, and the reformate gas flowing into the condenser 12 from the reformate gas pipe 11 passes through a part of the isomerized fuel pipe 22B.

The interior of the housing 12A is filled with the reformate gas. The condenser 12 cools the reformate gas by performing heat exchange between the cooling water pipe 18 and the reformate gas, and separates the reformate gas into the decomposed fuel, which has a low condensation temperature, and the isomerized fuel, which has a high condensation temperature. The decomposed fuel stays in a gaseous form in the condenser 12 and flows into the decomposed fuel pipe 22A connected to the upper end face of the housing 12A. The isomerized fuel condenses into a liquid form in the condenser 12 and flows into the isomerized fuel pipe 22B connected to the lower end face of the housing 12A.

Referring again to FIG. 1, the cooling water pipe 18 is connected to a radiator 17 via a pump 19. The pump 19 may be an electrically driven pump or a pump driven by the output torque of the internal combustion engine 1 as long as it has a function for recirculating cooling water between the condenser 12 and the radiator 17.

The isomerized fuel pipe 22B is connected to an isomerized fuel storage tank 20 disposed beneath the condenser 12. The decomposed fuel pipe 22A is connected to a decomposed fuel storage tank 22 via a compressor 22.

The isomerized fuel does not differ from the unrefined fuel in the main fuel storage tank 7 in molecular weight, but differs therefrom in that it is a high-octane-number fuel containing monomethyl, dimethyl, and trimethyl in its molecular architecture. Since the isomerized fuel is a high-octane-number fuel, when used as a fuel for the internal combustion engine 1, it brings about a preferable effect of preventing knocking. The isomerized fuel flows down the isomerized fuel pipe 22B and is stored in the isomerised fuel tank 20.

The decomposed fuel is a gaseous fuel containing hydrogen, methane, ethylene, etc., and when supplied together with the gasoline fuel to the internal combustion engine 1, it brings about a preferable effect of increasing the combustion speed of the gasoline fuel. The decomposed fuel that flows into the decomposed fuel pipe 22A from the condenser 12 is condensed by the compressor 23, which is driven by the internal combustion engine 1, and stored in the decomposed fuel storage tank 21 in liquid form under a predetermined pressure.

The fuel injector 8 is provided with the gasoline fuel in the main fuel storage tank 7 via a fuel pump 10 and a fuel supply pipe 9.

Next, the fuel supply system will be described.

Referring again to FIG. 1, the internal combustion engine 1 comprises four cylinders which are connected to an intake collector 2 via four intake branch pipes 3.

Four main fuel injectors 27 inject a gasoline fuel in the main fuel storage tank 7 to the respective cylinders of the internal combustion engine 1. For this purpose, a main fuel supply pump 25 pressurizes the gasoline fuel in the main fuel storage tank 7 and distributes the pressurized gasoline fuel to the respective fuel injectors 27 via a main fuel pipe 26. The fuel injected from the main fuel injector 27 is mixed with air that is aspirated from the intake collector 2 via the intake branch pipe 3, and forms a fuel-air mixture in the cylinder. It should be noted that the fuel injected by the main fuel injector 27 is the unreformed gasoline fuel.

The isomerized fuel in the isomerized fuel storage tank 20 is supplied to an isomerized fuel injector 33 installed in the intake collector 2, via an isomerized fuel supply pipe 31 after the fuel pressure is regulated to a predetermined pressure by a isomerized fuel pump 30. The isomerized fuel injector 33 injects the isomerized fuel into the intake collector 2. The injected isomerized fuel is mixed with air in the intake collector 2 and then aspirated into respective cylinders of the internal combustion engine 1 via intake branch pipes 3.

The decomposed fuel in the decomposed fuel storage tank 21 is supplied to a decomposed fuel injector 35 installed in the intake collector 2 via a decomposed fuel supply pipe 37. The decomposed fuel injector 35 injects the decomposed fuel into the intake collector 2. The injected decomposed fuel is mixed with air in the intake collector 2 and then aspirated into the respective cylinders of the internal combustion engine 1 via intake branch pipes 3.

Figure 5:
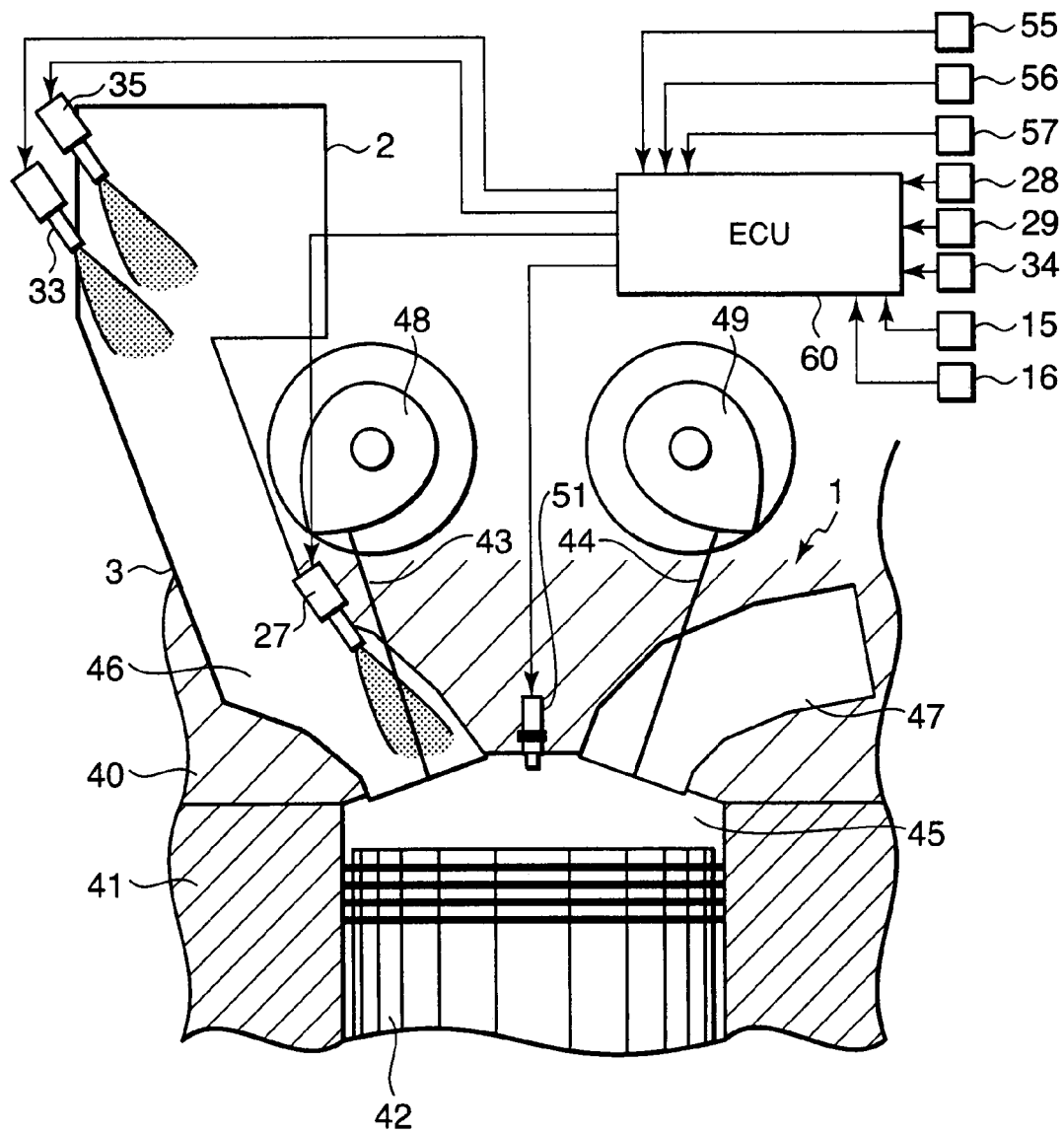
FIG. 5 is a schematic diagram of a fuel supply system for an internal combustion engine, which is a part of the fuel supply device.

Referring to FIG. 5, a combustion chamber 45 is formed in each of the cylinders of the internal combustion engine 1 by a cylinder head 40, a cylinder block 41, a piston 42, an intake valve 43, and an exhaust valve 44. The intake valve 43 connects and disconnects the combustion chamber 45 to and from an intake port 46 connected to the intake branch pipe 3. The main fuel injector 27 is installed in the intake port 46, but this invention is applicable to a direct injection internal combustion engine in which the main fuel injector 27 is installed in the combustion chamber 45.

The exhaust valve 44 connects and disconnects the combustion chamber 45 to and from an exhaust port 47. The exhaust port 47 communicates with an exhaust branch pipe 4 shown in FIG. 1. As shown in FIG. 1, the internal combustion engine 1 comprises four exhaust branch pipes 4 which are converged into the exhaust pipe 70.

Referring again to FIG. 5, the intake valve 43 is driven by an intake valve cam 48 and the exhaust valve 44 is driven by an exhaust valve cam 49, between a fully open position and a fully closed position cyclically.

A spark plug 51 is provided in the combustion chamber 45 to ignite the fuel-air mixture in the combustion chamber 45.

According to the constitution described above, the air that has passed the air cleaner is aspirated into the combustion chamber 45 of the internal combustion engine 1 via the collector 2, intake branch pipe 3, intake port 46 and intake valve 43. In the course of this process, in the collector 2, isomerized fuel is injected into the air from the isomerized fuel injector 33 and decomposed fuel is injected into the air from the decomposed fuel injector 35, depending on the engine running condition.

In the intake port 46, the gasoline fuel in the main fuel storage tank 7 is injected into the air from the main fuel injector 27. The fuel-air mixture thus generated in the combustion chamber 45 is ignited by the spark plug 51 in the posterior half of the compression stroke or in the anterior half of the expansion stroke of the piston 42, thereby burning the fuel-air mixture to reciprocate the piston 42 by combustion pressure.

The fuel injection timing and injection period of the fuel injectors 8, 27, 33, 35, and the ignition timing of the spark plug 51 are controlled by command signals output respectively from an engine control unit (ECU) 60. The operation of the fuel pumps 10, 30, the opening of the air amount regulating valve 14, and the operation of the main fuel supply pump 25 are also controlled by the ECU 60.

The ECU 60 is constituted by a microcomputer comprising a central processing unit (CPU), a read-only memory (ROM), a random access memory (RAM), and an input/output interface (I/O interface). The ECU 60 may be constituted by a plurality of microcomputers.

In order to perform the above control, various detection signals are input into the ECU 60 including signals from an airflow meter 15 which detects an air supply flow rate to the reforming catalyst 6, a thermistor 16 which detects a temperature inside the reforming catalyst 6, a level sensor 28 which detects a liquid level of the main fuel in the main fuel storage tank 7, a level sensor 29 which detects a liquid level of the isomerized fuel in the isomerized fuel storage tank 20, a pressure sensor 34 which detects a fuel pressure of the decomposed fuel in the decomposed fuel tank 21, a crank angle sensor 55 which detects a crank angle and a rotation speed of the internal combustion engine 1, a water temperature sensor 56 which detects a cooling water temperature of the internal combustion engine 1, and an accelerator pedal depression sensor 57 which detects a depression amount of an accelerator pedal with which the vehicle is provided.

Figure 6:
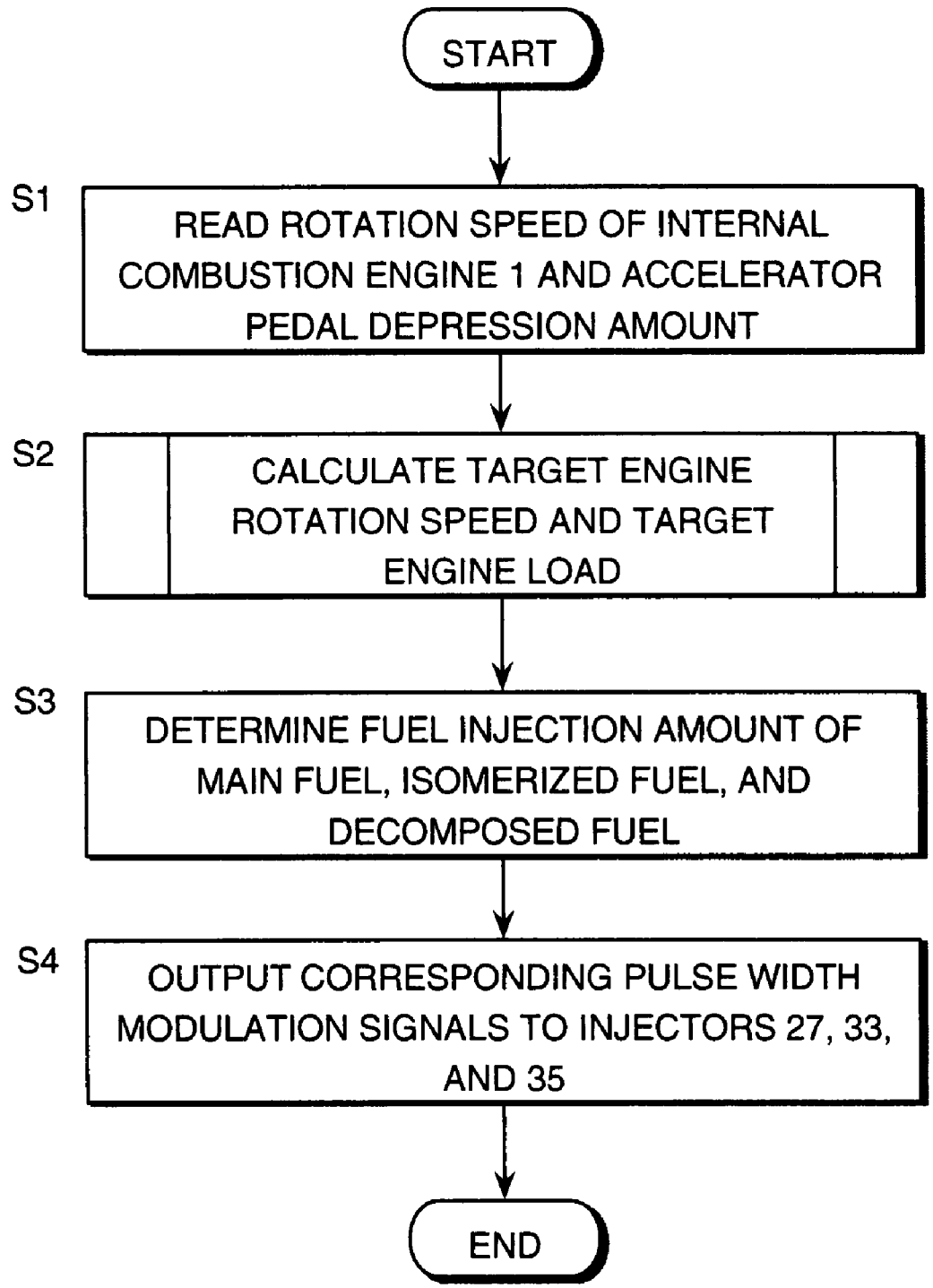
FIG. 6 is a flowchart describing a fuel injection control routine performed by an engine control unit according to this invention.

Referring to FIG. 6, a fuel injection control routine of the internal combustion engine 1 which is executed by the ECU 60 as a control routine of the fuel supply system will now be described. The ECU 60 executes this routine repeatedly at fixed intervals, e.g. ten milliseconds, while the internal combustion engine 1 is operative.

First, in a step S1, the ECU 60 reads the rotation speed of the internal combustion engine 1 detected by the crank angle sensor 55 and the accelerator pedal depression amount detected by the accelerator pedal depression sensor 57.

In a following step S2, the ECU 60 calculates a target engine rotation speed and a target engine load from the rotation speed of the internal combustion engine 1 and the accelerator pedal depression amount, and calculates a target fuel injection amount to realize the target engine rotation speed and the target engine load. This calculation is executed through a subroutine using a known calculation method.

Figure 8:
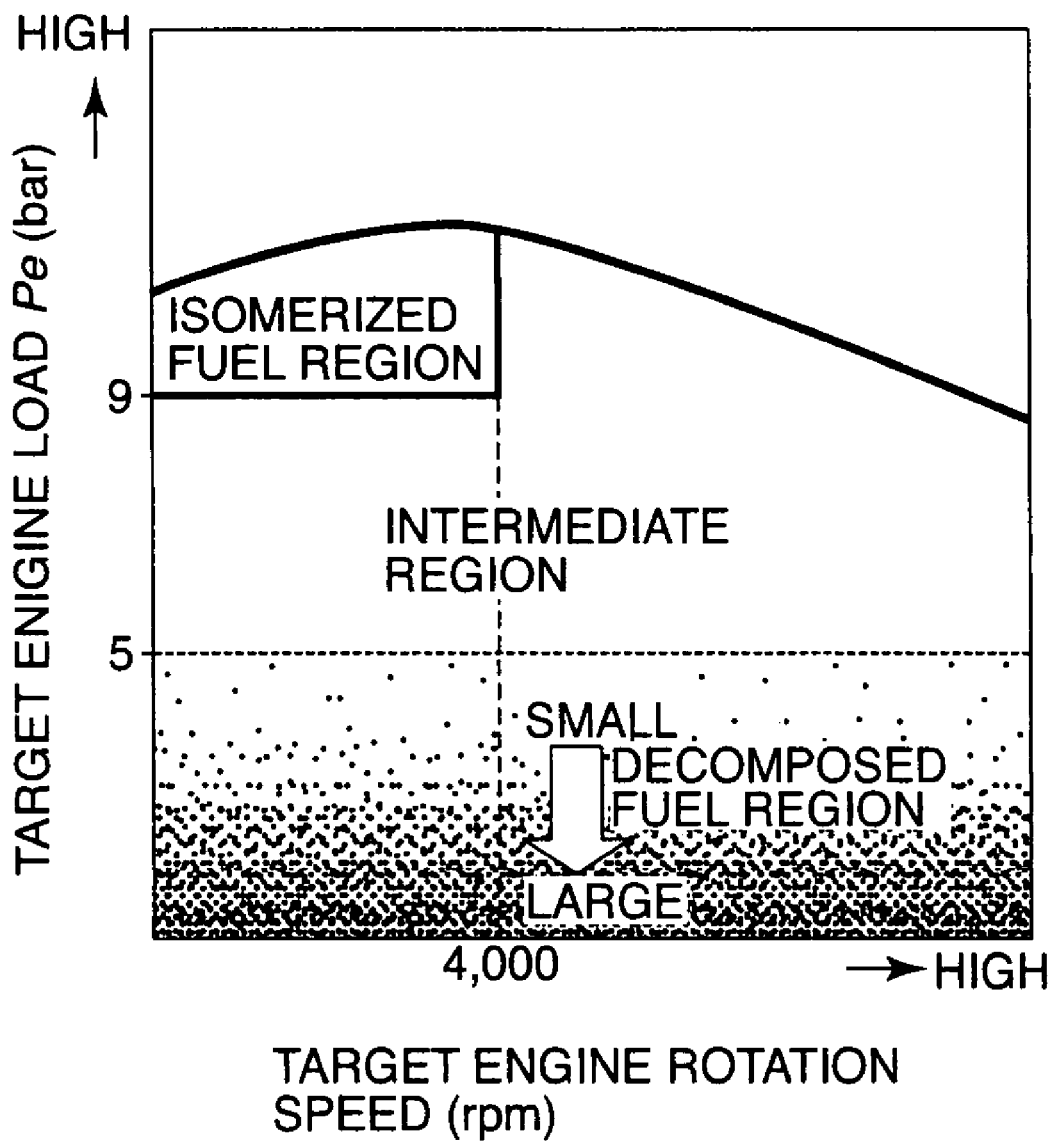
FIG. 8 is a diagram describing the characteristics of a fuel supply map for the internal combustion engine, stored by the engine control unit.

In a step S3, the ECU refers to a map having the characteristics shown in FIG. 8, which is stored in the ROM in advance, and determines the combination of the main fuel and reformate fuels and the ratio of the fuel amounts thereof to be applied on the basis of the target engine rotation speed and the target engine load of the internal combustion engine 1.

Referring to FIG. 8, the engine load is represented by an in-cylinder effective pressure Pe. The in-cylinder effective pressure Pe corresponds to a value obtained by subtracting a friction loss accompanying the piston stroke in the cylinder from an average pressure in the cylinder throughout one combustion cycle. The fuel injection in the internal combustion engine 1 is performed by a combination of the main fuel injection by the main fuel injector 27, and one or both of the isomerized fuel injection by the isomerized fuel injector 33 and the decomposed fuel injection by the decomposed fuel injector 35. The map also defines a ratio of the injection amount of the isomerized fuel with respect to the injection amount of the main fuel, as well as a ratio of the injection amount of the decomposed fuel with respect to the injection amount of the main fuel.

As shown in FIG. 8, according to this map, a low load engine condition in which the in-cylinder effective pressure Pe is lower than 5 bars is classified into a decomposed fuel region in which only the decomposed fuel is used as the reformate fuel. In the low load engine condition, the target fuel injection amount is calculated in the step S2 assuming a lean combustion. By constituting all the reformate fuel by the decomposed fuel which has a high combustion speed in this region, ignition of the fuel-air mixture in the lean combustion environment is ensured.

Further, in this decomposed fuel region, the ratio of the injection amount of the decomposed fuel with respect to the injection amount of the main fuel is set to increase as the in-cylinder effective pressure Pe falls.

In contrast, a low rotation speed/high load engine condition in which the in-cylinder effective pressure is higher than 9 bars and the target engine rotation speed is lower than 4,000 revolutions per minute (rpm) is classified into an isomerized fuel region in which only the isomerized fuel is used as the reformate fuel. In the isomerized fuel region, by constituting all the reformate fuel by the isomerized fuel which has a high-octane number, knocking is prevented from occurring in the internal combustion engine 1.

A curve shown in the upper part of the figure denotes a maximum load of the internal combustion engine 1. In other words, the internal combustion engine 1 does not operate in a region above this curve.

The region located between the isomerized fuel region and the decomposed fuel region is an intermediate region in which both the isomerized fuel and the decomposed fuel are supplied to the internal combustion engine 1. In the intermediate region, the ratio of the injection amount of the isomerized fuel is increased with respect to the ratio of the injection amount of the decomposed fuel as the target engine load increases. According to this setting, the internal combustion engine 1 enjoys a maximum fuel performance operation in given operation conditions.

As described hereinabove, the ECU 60 determines the main fuel injection amount and the injection amounts of the respective reformate fuels, i.e., the isomerized fuel and the decomposed fuel, in the step S3.

In a following step S4, the ECU 60 outputs pulse width modulation signals corresponding to the injection amounts of the main fuel, isomerized fuel and decomposed fuel to the fuel injectors 27, 33, and 35, respectively.

By executing the above routine, the internal combustion engine 1 enjoys stable lean combustion by the decomposed fuel supply in the low load engine condition while preventing knocking from occurring by the isomerized fuel supply in the low rotation speed/high load engine condition. As a result, the internal combustion engine 1 can generate a large output force while suppressing fuel consumption.

Next, fuel reforming control executed by the ECU 60 will be described.

As can be understood from the characteristics of the reforming catalyst 6 explained with reference to FIG. 3, it is possible to arbitrarily control the generation ratio of the isomerized fuel and the decomposed fuel.

It should be noted that the fuel flowing into the isomerized fuel storage tank 20 from the condenser 12 via the isomerized fuel pipe 22B is a mixture of the isomerized fuel and the unreformed fuel shown in FIG. 3. Accordingly, the fuel supplied to the internal combustion engine 1 in the fuel injection control routine of FIG. 6 as the isomerized fuel is not the pure isomerized fuel shown in FIG. 3, but a compound liquid of the pure isomerized fuel and the unreformed fuel. However, since this compound liquid still has an octane number much higher than the unreformed main fuel in the main fuel storage tank 7, the compound liquid stored in the isomerized fuel storage tank 20 is herein referred to as an isomerized fuel.

The temperature of the reforming catalyst 6 depends on the exhaust gas temperature and exothermic reaction in the catalytic converter 5. In this embodiment, the heat required for the reforming reaction is basically covered by the heat of the exhaust gas transferred from the exhaust pipe 70 to the reforming catalyst 6, whereas the temperature of the reforming catalyst 6 is controlled by supplying fuel or air to the reforming catalyst 6. When fuel and air are supplied to the reforming catalyst 6, a part of the fuel is oxidized in the reforming catalyst 6 and oxidation heat is generated. As a result, the temperature of the reforming catalyst 6 rises. In contrast, when only fuel is supplied to the reforming catalyst 6, the temperature of the reforming catalyst 6 falls.

Through this control, the ECU 60 arbitrarily varies the generation ratio of the isomerized fuel and the decomposed fuel.

Figure 7:
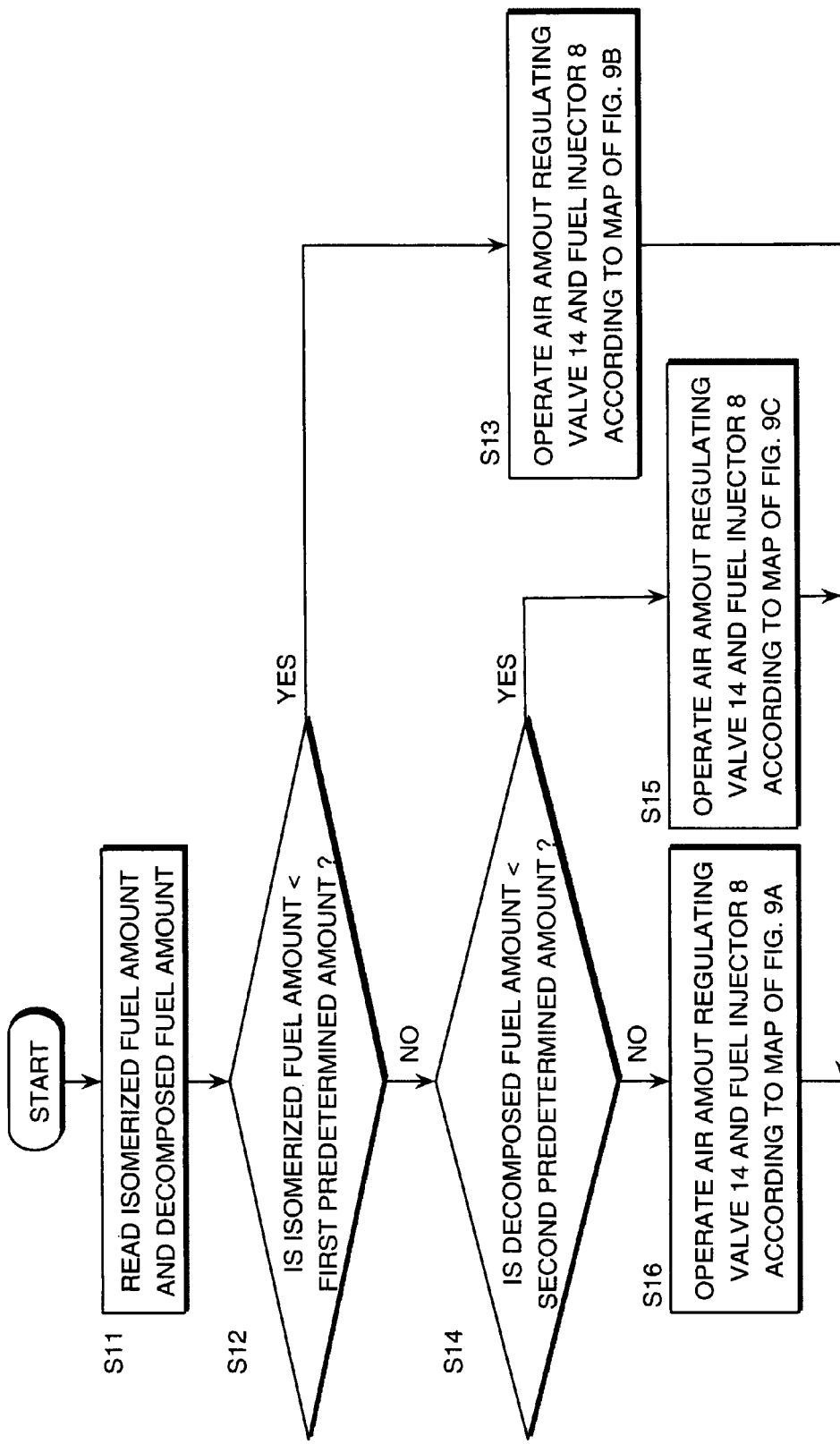
FIG. 7 is a flowchart describing a fuel reforming control routine performed by the engine control unit.

FIG. 7 shows a fuel reforming control routine executed by the ECU 60 as a control routine of the fuel reforming system. The ECU 60 executes this routine at fixed intervals of one second, for example, while the internal combustion engine 1 operates.

In a first step S11, the ECU 60 reads the isomerized fuel amount stored in the isomerized fuel storage tank 20, which is detected by the level sensor 29, and the composed fuel amount in the composed fuel storage tank 21, which is detected by the pressure sensor 34.

In a following step S12, the ECU 60 determines whether the isomerized fuel amount has fallen below a first predetermined amount. The first predetermined amount corresponds to a lower limit of the storage amount of the isomerized fuel. When the isomerized fuel amount has fallen below the first predetermined amount, the ECU 60 determines that a request for increasing the reaction ratio of the isomerization reforming reaction exists, and performs the processing of a step S13 to increase the generation amount of the isomerized fuel.

Specifically, in the step S13, the ECU 60 closes the air amount regulating valve 14 while causing the fuel injector 8 to inject fuel from the main fuel storage tank 7 towards the reforming catalyst 6.

Figure 9A:
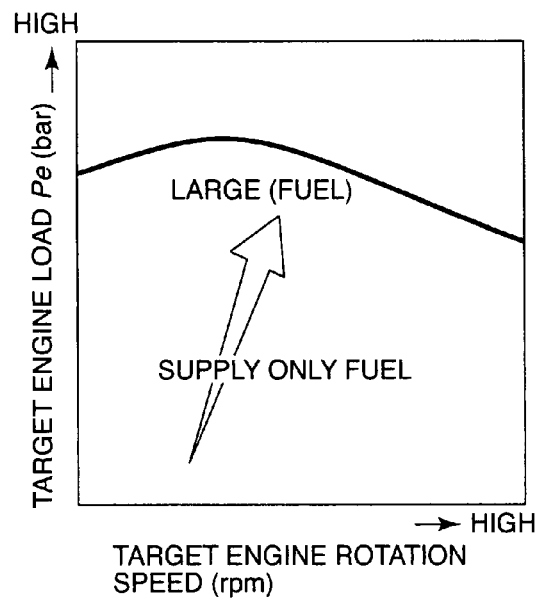
FIGS. 9A-9C are diagrams describing the characteristics of operation mode maps of the catalytic converter, stored by the engine control unit.
Figure 9B:
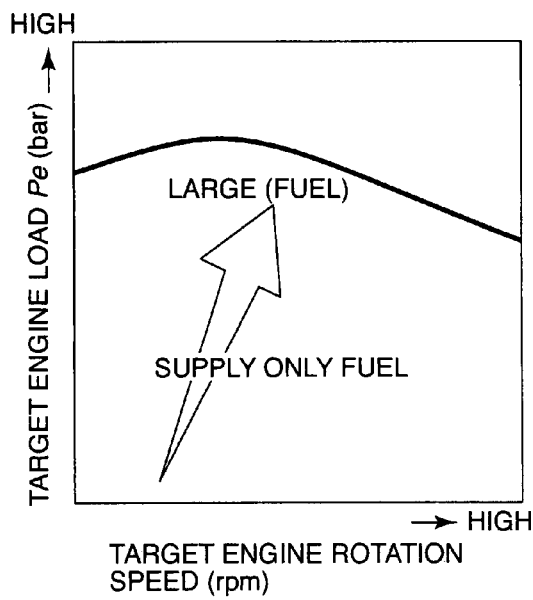

Referring to FIG. 9B, a map having the characteristics shown in the figure is stored in the ROM of the ECU 60 in advance to determine the fuel injection amount of the fuel injector 8. The ECU 60 determines the fuel injection amount of the fuel injector 8 by referring to this map on the basis of the target engine rotation speed and the target engine load of the internal combustion engine 1. According to this map, the fuel injection amount increases as the target engine load increases and as the target engine rotation speed increases.

The ECU 60 then outputs a pulse width modulation signal corresponding to the determined fuel injection amount to the fuel injector 8. According to this processing, the temperature of the reforming catalyst 6 is controlled to the temperature region A in FIG. 3, thereby increasing the generation ratio of the isomerized fuel. After executing the processing of the step S13, the ECU 60 terminates the routine.

When on the other hand, the isomerized fuel amount has not fallen below a first predetermined amount in the step S12, the ECU 60 determines whether the decomposed fuel amount in the decomposed fuel storage tank 21 has fallen below a second predetermined amount in a step S14. The second predetermined amount corresponds to a lower limit of the storage amount of the decomposed fuel. When the decomposed fuel amount has fallen below the second predetermined amount, the ECU 60 determines that a request for increasing the reaction ratio of the decomposition reforming reaction exists, and performs the processing of a step S15 to increase the generation amount of the decomposed fuel.

Specifically, in the step S15, the ECU 60 determines the fuel injection amount of the fuel injector 8 and the air supply flow rate of the air amount regulating valve 14 on the basis of the target engine rotation speed and the target engine load of the internal combustion engine 1 by referring to a map stored in the ROM of the ECU 60 in advance. The characteristic of this map is shown in FIG. 9C.

Figure 9C:
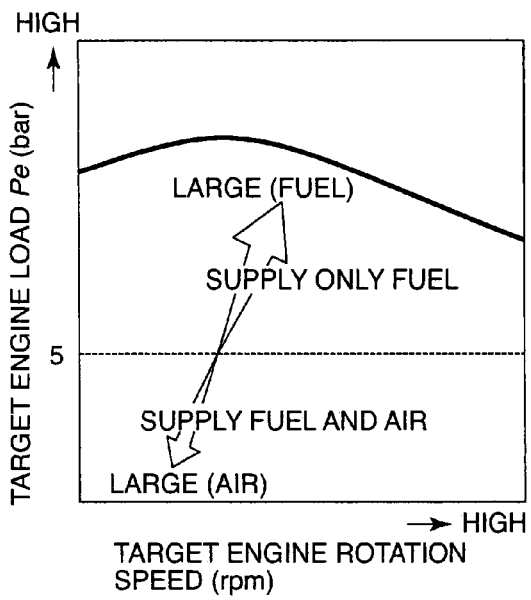

Referring to FIG. 9C, in a low load engine condition where the target engine load converted into the in-cylinder effective pressure Pe is below 5 bars, the ECU 60 opens the air amount regulating valve 14 to supply air to the reforming catalyst 60 while causing the fuel injector 8 to inject the main fuel in the main fuel storage tank 7 towards the reforming catalyst 6. Herein, the fuel injection amount is fixed while the air supply flow rate of the air amount regulating valve 14 is determined by referring to the map of FIG. 9C. The map has a characteristic to increase the air supply flow rate of the air amount regulating valve 14 as the target engine load decreases. The ECU 60 controls the opening of the air amount regulating valve 14 to realize the determined air supply flow rate.

When the target engine load converted into the in-cylinder effective pressure Pe is not below 5 bars, the ECU 60 closes the air amount regulating valve 14 and causes the fuel injector 8 to inject the main fuel from the main fuel storage tank 7 towards the reforming catalyst 6. Herein, the fuel injection amount of the fuel injector 8 is determined by referring to the map of FIG. 9C. The map has a characteristic to increase the fuel injection amount as the target engine load increases. The ECU 60 then outputs a pulse width modulation signal corresponding to the determined fuel injection amount to the fuel injector 8.

According to the processing of the step S15, the temperature of the reforming catalyst 6 is controlled to the temperature region C in FIG. 3, thereby increasing the generation ratio of the decomposed fuel. After executing the processing of the step S15, the ECU 60 terminates the routine.

In the step S14, when the decomposed fuel amount has not fallen below the second predetermined amount, the ECU 60 performs the processing of a step S16 to cause the reforming catalyst 6 to induce the generation of the isomerized fuel and the decomposed fuel.

Specifically, in the step S16, the ECU 60 closes the air amount regulating valve 14 while causing the fuel injector 8 to inject fuel from the main fuel storage tank 7 towards the reforming catalyst 6. To determine the fuel injection amount of the fuel injector 8 in this state, a map having a characteristic shown in FIG. 9A is stored in the ROM of the ECU 60 in advance.

The ECU 60 determines the fuel injection amount of the fuel injector 8 on the basis of the target engine rotation speed and the target engine load of the internal combustion engine 1 by referring to this map. This map has a characteristic to increase the fuel injection amount as the target engine rotation speed increases and the target engine load increases. However, in comparison with the map of FIG. 9B, which has a similar characteristic, this map gives a smaller fuel injection amount for the same target engine rotation speed and the same target engine load. The ECU 60 then outputs a pulse width modulation signal corresponding to the determined fuel injection amount to the fuel injector 8.

According to the processing of the step S16, the temperature of the reforming catalyst 6 is controlled to the temperature region B in FIG. 3, thereby causing the reforming catalyst 6 to induce the generation of the isomerized fuel and the decomposed fuel in parallel. After executing the processing of the step S16, the ECU 60 terminates the routine.

According to the execution of the above routine by the ECU 60, the generation ratio of the isomerized fuel and the decomposed fuel can be arbitrarily altered.

Since air supply to the reforming catalyst 6 by the air amount regulating valve 14 is only performed in the low load engine condition shown in FIG. 9C, and the decomposition reforming reaction does not consume air, the nitrogen content of the decomposed fuel in the decomposed fuel storage tank 21 is suppressed to be low.

When the internal combustion engine 1 operates at a high load, the exhaust gas temperature is high, and hence the temperature of the reforming catalyst 6 is also high. When the isomerized fuel amount has fallen below the first predetermined amount in this situation, or in other words when the processing of the step S13 has to be executed in this situation, the temperature of the reforming catalyst 6 must be lowered promptly. This requirement is fulfilled by increase correcting the fuel injection amount of the fuel injector 8 in the step S13 to increase the fuel supply amount to the reforming catalyst 6 per unit time.

When on the other hand, the internal combustion engine 1 operates at a low load, the exhaust gas temperature is low, and hence the temperature of the reforming catalyst 6 is also low. When the decomposed fuel amount has fallen below the second predetermined amount in this situation, or in other words the processing of the steps S15 has to be executed in this situation, the temperature of the reforming catalyst 6 must be raised promptly. This requirement is fulfilled by increase-correcting the opening of the air amount regulating valve 14 in the step S15 to increase the air supply flow rate to the reforming catalyst 6.

Next, referring to FIGS. 10 and 11, a second embodiment of this invention will be described.

Figure 10:
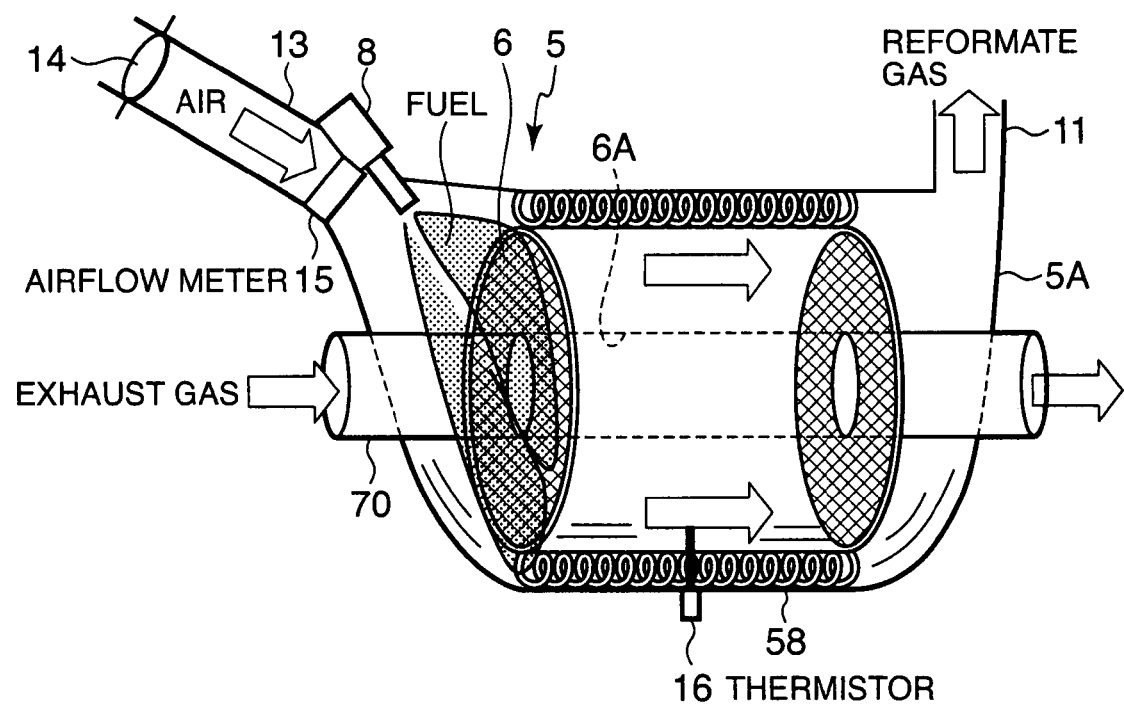
FIG. 10 is similar to FIG. 2, but shows a second embodiment of this invention.

Referring to FIG. 10, this embodiment further comprises an electric heater 58 installed in the catalytic converter 5 in order to heat the reforming catalyst 6. The hardware constitution other than the heater 59 is identical to that of the first embodiment.

Figure 11:
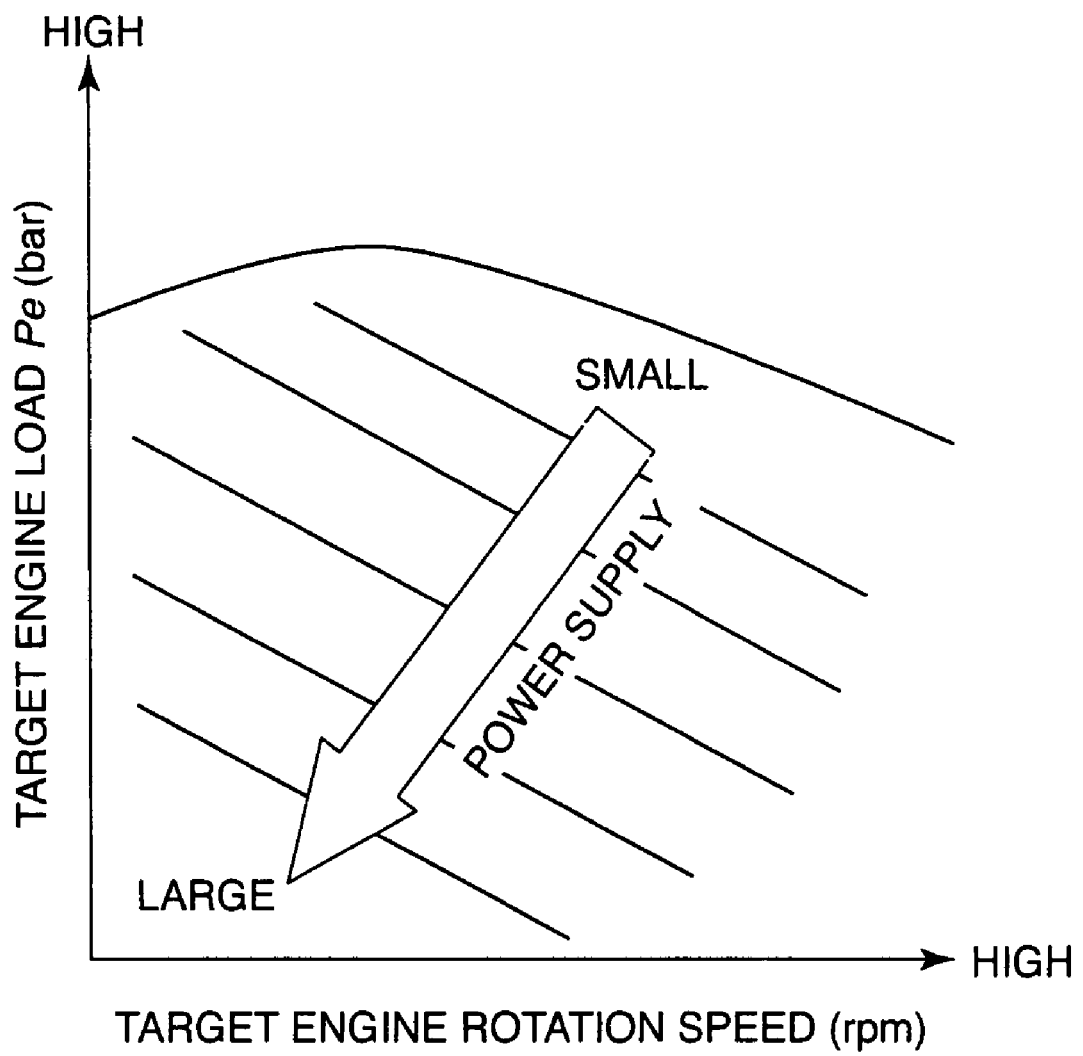
FIG. 11 is a diagram describing the characteristics of a power supply map for an electric heater stored by an engine control unit according to the second embodiment of this invention.

The electric heater 58 is activated under the criteria shown in FIG. 11.

Specifically, the electric heater 58 is activated in a low load engine condition in which the temperature of the reforming catalyst 6 does not rise promptly. In this condition, the heat generated by the electric heater 58 is used for heating the reforming catalyst 6 directly to raise the temperature thereof. The ECU 60 controls power supply to the electric heater 58 along with the temperature control of the reforming catalyst 6 through the execution of the fuel reforming control routine of FIG. 7.

To control the power supply to the electric heater 58, a heater power supply map having the characteristic shown in FIG. 11 is stored in the ROM of the ECU 60 in advance. This map gives a greater heater power supply amount as the target engine rotation speed and the target engine load of the internal combustion engine 1 decrease. The ECU 60 determines the heater power supply amount on the basis of the target engine rotation speed and the target engine load by referring to this map, and supplies electric power to the electric heater 58 accordingly.

According to this embodiment, the temperature raising control of the reforming catalyst 6 when the temperature of the internal combustion engine 1 is low can be accomplished in a short time.

Next, referring to FIGS. 12 and 13, and FIGS. 14A and 14B, a third embodiment of this invention will be described.

Figure 13:
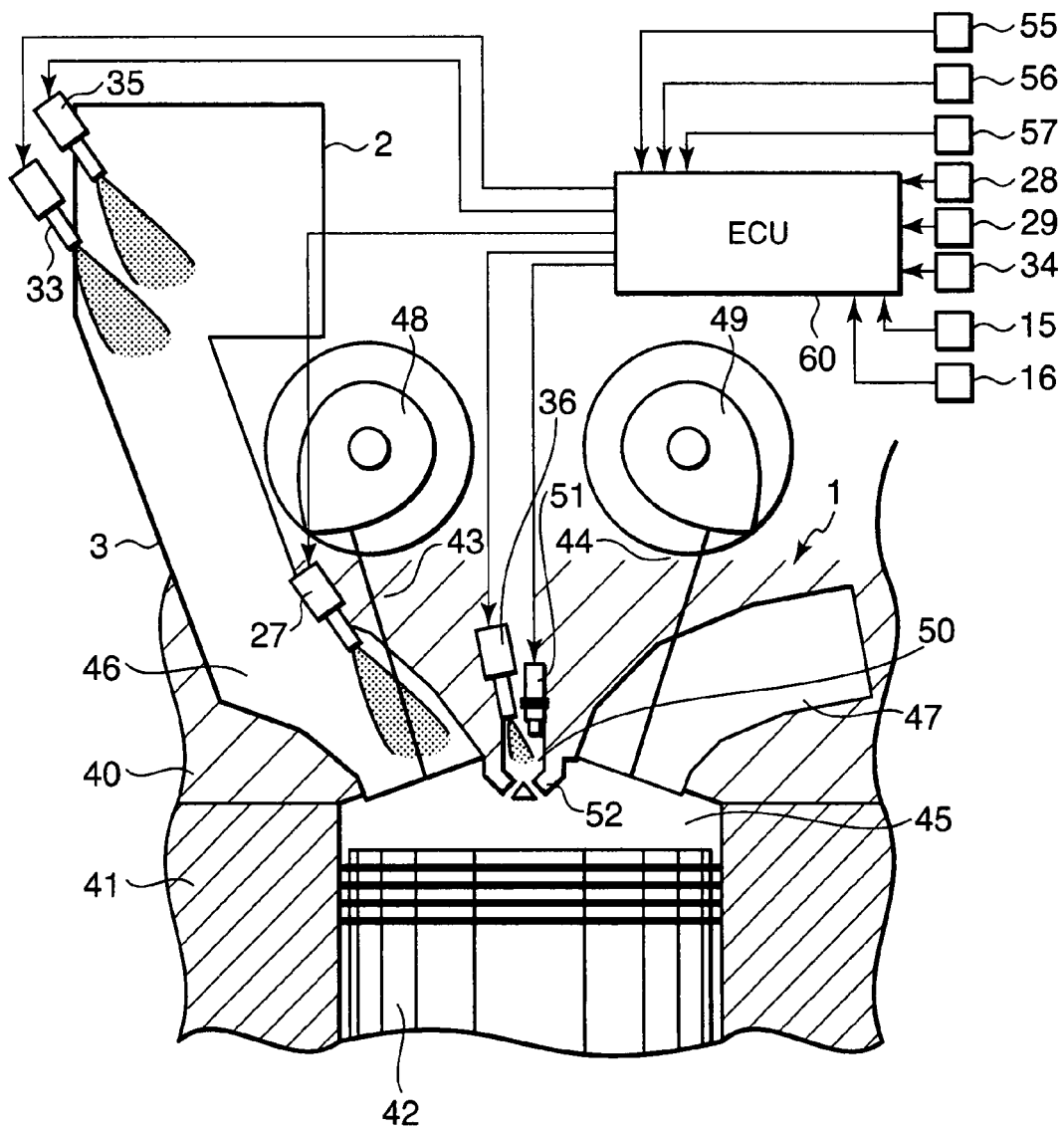
FIG. 13 is a schematic diagram of a fuel supply system for an internal combustion engine, which is a part of a fuel supply device according to the third embodiment of this invention.

Referring to FIG. 13, according to this embodiment, the internal combustion engine 1 further comprises an auxiliary combustion chamber 50 in the cylinder head 40 adjacent to the combustion chamber 45 (hereinafter referred to as a main combustion chamber 45) in each cylinder.

The capacity of the auxiliary combustion chamber 50 is set smaller than that of the main combustion chamber. A spouting hole 52 formed in the cylinder head 40 connects the auxiliary combustion chamber 50 with the main combustion chamber 45.

The internal combustion engine 1 further comprises a second decomposed fuel injector 36 installed in the cylinder head 40 facing the auxiliary combustion chamber 50. The second decomposed fuel injector 36 injects the decomposed fuel in the decomposed fuel storage tank 21 into the auxiliary combustion chamber 50. Further, according to this embodiment, the spark plug 51 that was installed in the cylinder head 40 facing the main combustion chamber 45 in the first embodiment is relocated to a position facing the auxiliary combustion chamber 50.

Figure 12:
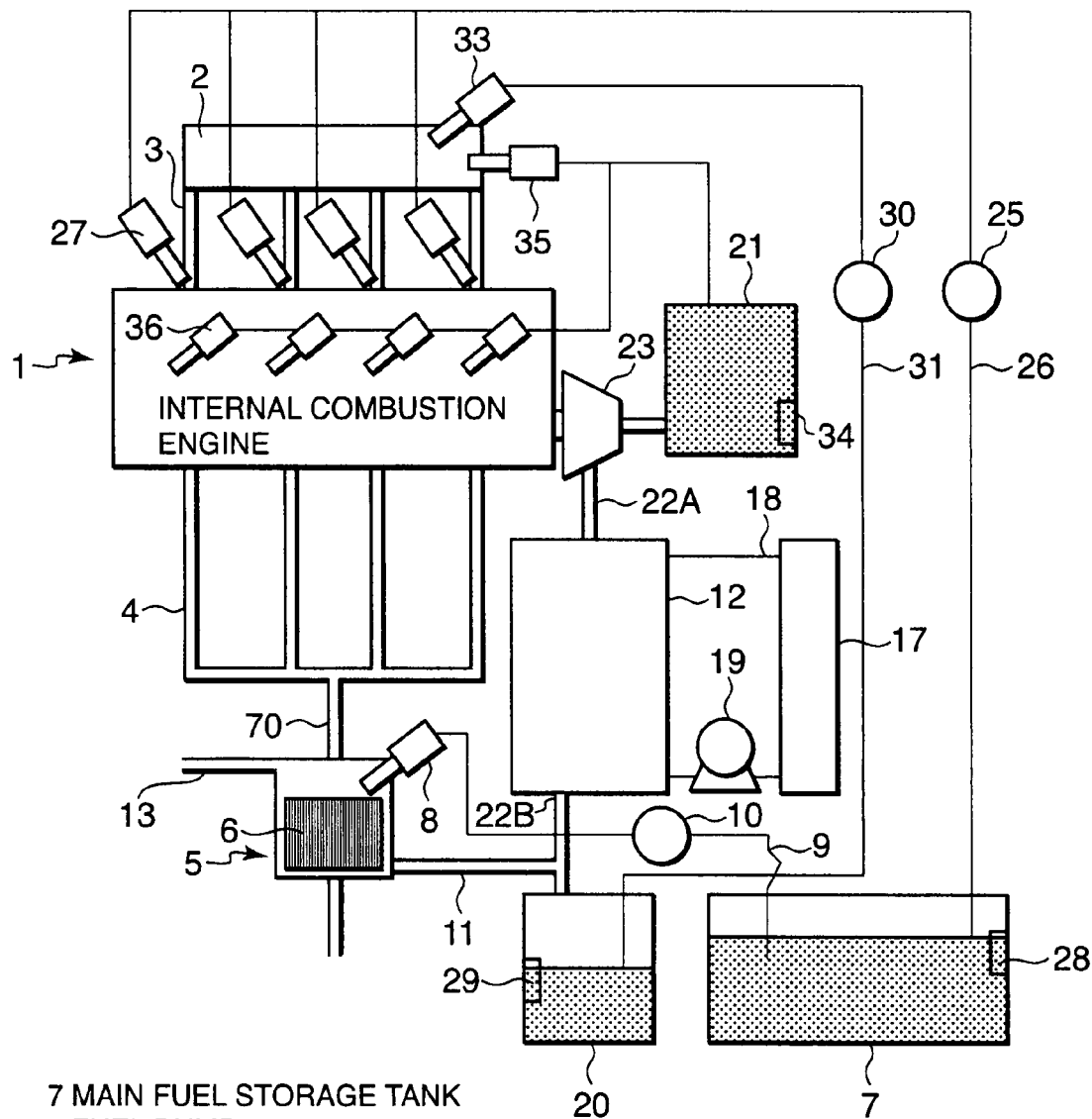
FIG. 12 is similar to FIG. 1, but shows a third embodiment of this invention.

Referring to FIG. 12, each of the fuel injectors 36 injects the decomposed fuel into the auxiliary combustion chamber 50 in an injection amount corresponding to a pulse width modulation signal input from the ECU 60.

As in the case of the first embodiment, the air that has passed the air cleaner is aspirated into the main combustion chamber 45 via the collector 2, intake branch pipe 3, intake port 46, and intake valve 43. The spark plug 51 ignites the decomposed fuel in the auxiliary combustion chamber 50 according to an ignition signal output from the ECU 60. The ignition timing is set at a timing in the posterior half of the compression stroke or anterior half of the expansion stroke of the piston 42.

The high combustion speed decomposed fuel ignited in the auxiliary combustion chamber 50 forms a substantially column-shaped torch like flame spouting out from the auxiliary combustion chamber 50 into the main combustion chamber 45 via the spouting hole 52, and burns the fuel-air mixture in the main combustion chamber 45.

Next, referring to FIGS. 14A and 14B, control of the fuel supply to the main combustion chamber 45 and the auxiliary combustion chamber 40 undertaken by the ECU 60 will be described.

Figure 14A:
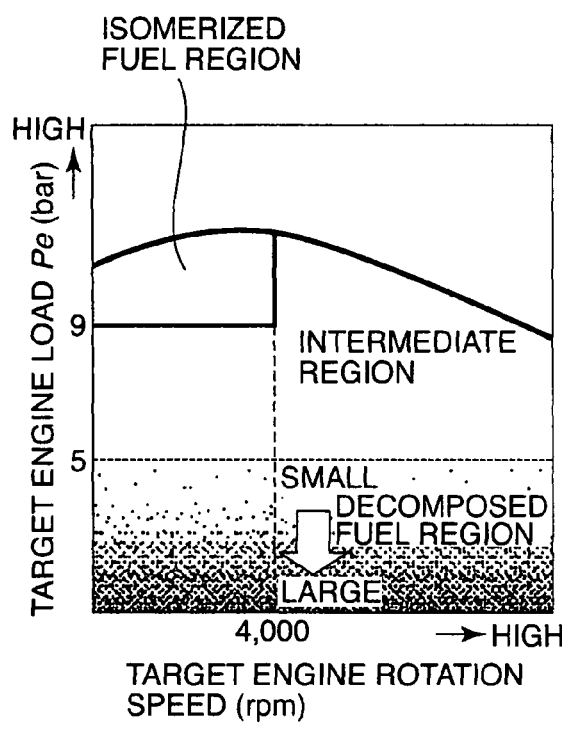
FIGS. 14A and 14B are diagrams showing the characteristics of fuel supply maps for the internal combustion engine, stored by an engine control unit according to the third embodiment of this invention.
Figure 14B:
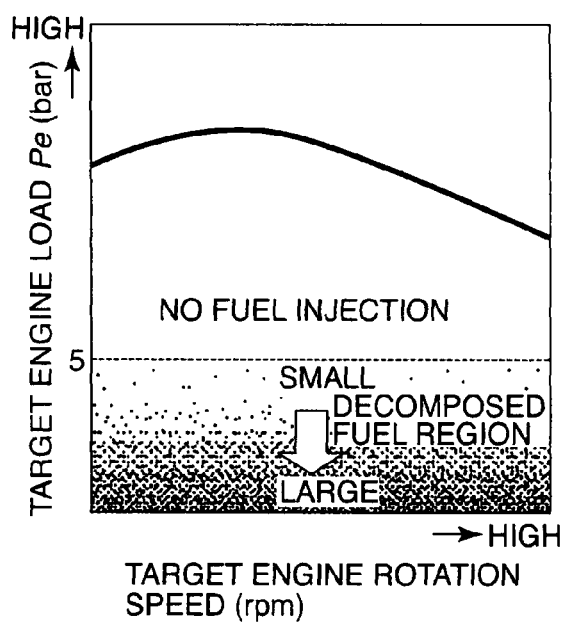

With respect to the fuel supply to the main combustion chamber 45, the ECU controls the injection amounts of the main fuel, the isomerized fuel, and the decomposed fuel injected respectively by the fuel injectors 27, 33, and 35 according to a map having a characteristic shown in FIG. 14A, which is identical to the map of FIG. 8 of the first embodiment.

Further, according to this embodiment, in the low load engine condition in which the in-cylinder effective pressure Pe falls below 5 bars, the ECU 60 causes the second decomposed fuel injector 36 to inject the decomposed fuel into the auxiliary combustion chamber 50 by referring to a map having the characteristic shown in FIG. 14B while controlling the first decomposed fuel injector 35 to inject the decomposed fuel into the main combustion chamber 45.

The decomposed fuel injection amount of the second decomposed fuel injector 36 is set to be much smaller than the decomposed fuel injection amount of the first decomposed fuel injector 35, but is proportional to the decomposed fuel injection amount of the decomposed fuel injector 35. In other words, the decomposed fuel injection amount of the second decomposed fuel injector 36 also increases as the target engine load decreases. When the in-cylinder effective pressure Pe does not fall below 5 bars, fuel injection is not performed by the second decomposed fuel injector 36.

As described above, this embodiment injects the decomposed fuel having a high combustion speed into the auxiliary combustion chamber 50 such that the torch like flame spouting out from the spouting hole 52 burns the fuel-air mixture in the main combustion chamber 45, only when the low load engine condition is sustained. According to this embodiment, therefore, the stability of combustion of the fuel-air mixture in the main combustion chamber 45 is further enhanced with respect to the case of the first embodiment.

The contents of Tokugan 2006-028635, with a filing date of Feb. 6, 2006 in Japan, and Tokugan 2006-028634 with a filing date of Feb. 6, 2006 in Japan, are hereby incorporated by reference.

Although the invention has been described above with reference to certain embodiments of the invention, the invention is not limited to the embodiments described above. Modifications and variations of the embodiments described above will occur to those skilled in the art, within the scope of the claims.

For example, in the above embodiments described above, the processing of the steps S13-S15 is performed on the basis of the target engine rotation speed and the target engine load of the internal combustion engine 1. However, it is also possible to perform the processing of the steps S13-S15 on the basis of a real rotation speed and a real engine load of the internal combustion engine 1.

The embodiments of this invention in which an exclusive property or privilege is claimed are defined as follows:

What is claimed is:

1. A fuel supply device for supplying fuel to an internal combustion engine, comprising:
   a reforming catalyst which induces an isomerization reforming reaction and a decomposition reforming reaction of a source fuel at a different reaction ratio depending on a catalyst temperature of the reforming catalyst;
   a catalyst temperature varying mechanism which varies the catalyst temperature; a fuel supply mechanism which supplies an isomerized fuel generated by the isomerization reforming reaction and a decomposed fuel generated by the decomposition reforming reaction respectively to the internal combustion engine; and
   a programmable controller programmed to:
   determine whether a request for increasing a reaction ratio of the isomerization reforming reaction exists;
   control the catalyst temperature varying mechanism to regulate the catalyst temperature to a temperature below a predetermined temperature, when the request for increasing the reaction ratio of the isomerization reforming reaction has been determined to exist;
   determine whether a request for increasing a reaction ratio of the decomposition reforming reaction exists; and
   control the catalyst temperature varying mechanism to regulate the catalyst temperature to a temperature above the predetermined temperature when the request for increasing the reaction ratio of the decomposition reforming reaction has been determined to exist.

2. The fuel supply device as defined in claim 1, wherein the source fuel is a gasoline fuel, and the isomerization reforming reaction and the decomposition reforming reaction are represented respectively by the following relations:

Isomerization reforming reaction:
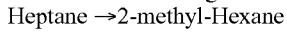
Heptane →2-methyl-Hexane

Decomposition reforming reaction:
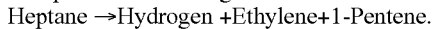
Heptane →Hydrogen +Ethylene+1-Pentene.

3. The fuel supply device as defined in claim 1, wherein the catalyst temperature varying mechanism comprises a fuel injector which injects the source fuel towards the reforming catalyst, and the programmable controller is further programmed to control the catalyst temperature by regulating a fuel injection amount of the fuel injector.

4. The fuel supply device as defined in claim 3, wherein the programmable controller is further programmed to control the fuel injector to increase the fuel injection amount as a rotation speed of the internal combustion engine increases or an engine load of the internal combustion engine increases, when the request for increasing the reaction ratio of the isomerization reforming reaction has been determined to exist.

5. The fuel supply device as defined in claim 4, wherein the programmable controller is further programmed to control the fuel injector to increase the fuel injection amount as a rotation speed of the internal combustion engine increases and an engine load of the internal combustion engine increases, when neither of the request for increasing the reaction ratio of the isomerization reforming reaction nor the request for increasing the reaction ratio of the decomposition reforming reaction has been determined to exist, while keeping the fuel injection amount smaller than the fuel injection amount when the request for increasing the reaction ratio of the isomerization reforming reaction has been determined to exist.

6. The fuel supply device as defined in claim 3, wherein the catalyst temperature varying mechanism further comprises an air amount regulator which supplies air to the reforming catalyst, and the programmable controller is further programmed to control the catalyst temperature by regulating the fuel injection amount of the fuel injector and an air supply amount of the air amount regulator.

7. The fuel supply device as defined in claim 6, wherein the programmable controller is further programmed to prevent the air amount regulator from supplying air when the request for increasing the reaction ratio of the decomposition reforming reaction has not been determined to exist.

8. The fuel supply device as defined in claim 7, wherein the programmable controller is further programmed to control the air amount regulator to supply air and control the fuel injector to inject fuel, when the request for increasing the reaction ratio of the decomposition reforming reaction has been determined to exist and an engine load of the internal combustion engine is smaller than a predetermined load.

9. The fuel supply device as defined in claim 8, wherein the programmable controller is further programmed to control the air amount regulator to increase an air supply amount as the engine load of the internal combustion engine decreases.

10. The fuel supply device as defined in claim 8, wherein the programmable controller is further programmed to prevent the air amount regulator from supplying air and control the fuel injector to increase the fuel supply amount as a rotation speed of the internal combustion engine increases and an engine load of the internal combustion engine increases, when the request for increasing the reaction ratio of the decomposition reforming reaction has been determined to exist and an engine load of the internal combustion engine is not smaller than the predetermined load.

11. The fuel supply device as defined in claim 1, wherein the programmable controller is further programmed to control the catalyst temperature varying mechanism to regulate the catalyst temperature to a temperature below the predetermined temperature when the request for increasing the reaction ratio of the isomerization reforming reaction has been determined to exist, irrespective of the determination as to whether the request for increasing the reaction ratio of the decomposition reforming reaction exists.

12. The fuel supply device as defined in claim 1, wherein the predetermined temperature is a temperature at which the reforming catalyst induces both the isomerization reforming reaction and the decomposition reforming reaction, and the programmable controller is further programmed to control the catalyst temperature varying mechanism to maintain the catalyst temperature at the predetermined temperature when neither of the request for increasing the reaction ratio of the isomerization reforming reaction nor the request for increasing the reaction ratio of the decomposition reforming reaction has been determined to exist.

13. The fuel supply device as defined in claim 12, wherein the predetermined temperature is set around 500 kelvin, and the programmable controller is further programmed to control the catalyst temperature varying mechanism to regulate the catalyst temperature to around 450 kelvin when the request for increasing the reaction ratio of the isomerization reforming reaction has been determined to exist, and control the catalyst temperature varying mechanism to regulate the catalyst temperature to around 550 kelvin when the request for increasing the reaction ratio of the decomposition reforming reaction has been determined to exist.

14. The fuel supply device as defined in claim 1, wherein the device further comprises an electric heater which heats the reforming catalyst, and the programmable controller is further programmed to increase an electric power supplied to the electric heater as a rotation speed of the internal combustion engine decreases or an engine load of the internal combustion engine decreases.

15. The fuel supply device as defined in claim 1, wherein the internal combustion engine comprises an exhaust pipe which discharges an exhaust gas generated by a combustion of fuels, and the reforming catalyst is disposed in thermal contact with the exhaust pipe.

16. The fuel supply device as defined in claim 15, wherein the reforming catalyst is formed into a cylindrical shape having an axial through-hole penetrated by the exhaust pipe.

17. The fuel supply device as defined in claim 1, further comprising an isomerized fuel storage tank which stores the isomerized fuel.

18. The fuel supply device as defined in claim 17, wherein the device further comprises a sensor which detects a storage amount of the isomerized fuel in the isomerized fuel storage tank, and the programmable controller is further programmed to determine that the request for increasing the reaction ratio of the isomerization reforming reaction exists when the storage amount of the isomerized fuel falls below a first predetermined amount.

19. The fuel supply device as defined in claim 1, further comprising a decomposed fuel storage tank which stores the decomposed fuel.

20. The fuel supply device as defined in claim 19, wherein the device further comprises a sensor which detects a storage amount of the decomposed fuel in the decomposed fuel storage tank, and the programmable controller is further programmed to determine that the request for increasing the reaction ratio of the decomposition reforming reaction exists when the storage amount of the decomposed fuel falls below a second predetermined amount.

21. The fuel supply device as defined in claim 1, wherein the programmable controller is further programmed to control the fuel supply mechanism to vary a supply ratio of the isomerized fuel and the decomposed fuel to the internal combustion engine on the basis of a running condition of the internal combustion engine.

22. The fuel supply device as defined in claim 21, wherein the running condition is a target engine rotation speed and a target engine load of the internal combustion engine, and the programmable controller is further programmed to determine whether the running condition corresponds to a low rotation speed/high load region, and control the fuel supply mechanism to increase the supply ratio of the isomerized fuel to the internal combustion engine when the running condition has been determined to correspond to the low rotation speed/high load region.

23. The fuel supply device as defined in claim 22, wherein the low rotation speed/high load region is a region in which the engine rotation speed is lower than 4,000 revolutions per minute and an in-cylinder effective pressure is higher than 9 bars.

24. The fuel supply device as defined in claim 22, wherein the programmable controller is further programmed to determine whether the internal combustion engine operates in a low load region, and control the fuel supply mechanism to increase the supply ratio of the decomposed fuel to the internal combustion engine when the internal combustion engine has been determined to operate in the low load region.

25. The fuel supply device as defined in claim 24, wherein the low load region is a region in which the in-cylinder effective pressure is lower than 5 bars.

26. The fuel supply device as defined in claim 24, wherein the programmable controller is further programmed to control the fuel supply mechanism to decrease the supply ratio of the decomposed fuel to the internal combustion engine as the load of the internal combustion engine increases within the low load region.

27. The fuel supply device as defined in claim 26, wherein the programmable controller is further programmed to control the fuel supply mechanism to supply both the isomerized fuel and the decomposed fuel to the internal combustion engine while decreasing the supply ratio of the decomposed fuel with respect to the supply ratio of the isomerized fuel as the load of the internal combustion engine increases, when the internal combustion engine has been determined to operate neither in the low rotation speed/high load region nor in the low load region.

28. The fuel supply device as defined in claim 1, wherein the internal combustion engine comprises a plurality of combustion chambers and an intake collector which distributes air to the plurality of combustion chambers, and the fuel supply mechanism comprises a main fuel injector which supplies a source fuel to each of the combustion chambers, a isomerized fuel injector which supplies the isomerized fuel to the intake collector, and a decomposed fuel injector which supplies the decomposed fuel to the intake collector.

29. The fuel supply device as defined in claim 28, wherein the internal combustion engine further comprises an auxiliary combustion chamber which has a smaller capacity than the combustion chamber, a spouting hole connecting a main combustion chamber and the auxiliary combustion chamber, and an ignition mechanism which ignites a fuel in the auxiliary combustion chamber, and the fuel supply mechanism further comprises a second decomposed fuel injector which injects the decomposed fuel into the auxiliary combustion chamber.

30. The fuel supply device as defined in claim 29, wherein the programmable controller is further programmed to determine whether the internal combustion engine operates in a low load region, and prevent the second decomposed fuel injector from injecting the decomposed fuel into the auxiliary combustion chamber unless the internal combustion engine has been determined to operate in the low load region.

31. The fuel supply device as defined in claim 30, wherein the programmable controller is further programmed to control the second decomposed fuel injector to increase an injection amount of the decomposed fuel into the auxiliary combustion chamber as the load of the internal combustion engine decreases, when the internal combustion engine has been determined to operate in the low load region.

32. A fuel supply device for supplying fuel to an internal combustion engine, comprising:
  a reforming catalyst which induces an isomerization reforming reaction and a decomposition reforming reaction of a source fuel at a different reaction ratio depending on a catalyst temperature of the reforming catalyst;
  means for varying the catalyst temperature;
  means for supplying an isomerized fuel generated by the isomerization reforming reaction and a decomposed fuel generated by the decomposition reforming reaction respectively to the internal combustion engine;

means for determining whether a request for increasing a reaction ratio of the isomerization reforming reaction exists;

means for controlling the catalyst temperature varying means to lower the catalyst temperature below a predetermined temperature when the request for increasing the reaction ratio of the isomerization reforming reaction has been determined to exist;

means for determining whether a request for increasing a reaction ratio of the decomposition reforming reaction exists; and means for controlling the catalyst temperature varying means to raise the catalyst temperature above the predetermined temperature when the request for increasing the reaction ratio of the decomposition reforming reaction has been determined to exist.

33. A control method for a fuel supply device which supplies fuel to an internal combustion engine, the fuel supply device comprising a reforming catalyst which induces an isomerization reforming reaction and a decomposition reforming reaction of a source fuel at a different reaction ratio depending on a catalyst temperature of the reforming catalyst, a catalyst temperature varying mechanism which varies the catalyst temperature, and a fuel supply mechanism which supplies an isomerized fuel generated by the isomerization reforming reaction and a decomposed fuel generated by the decomposition reforming reaction respectively to the internal combustion engine, the method comprising:

determining whether a request for increasing a reaction ratio of the isomerization reforming reaction exists;

controlling the catalyst temperature varying mechanism to lower the catalyst temperature below a predetermined temperature, when the request for increasing the reaction ratio of the isomerization reforming reaction has been determined to exist;

determining whether a request for increasing a reaction ratio of the decomposition reforming reaction exists; and controlling the catalyst temperature varying mechanism to raise the catalyst temperature above the predetermined temperature when the request for increasing the reaction ratio of the decomposition reforming reaction has been determined to exist.

* * * * *

UNITED STATES PATENT AND TRADEMARK OFFICE
CERTIFICATE OF CORRECTION

| | |
|---|---|
| PATENT NO. | : 7,771,675 B2 |
| APPLICATION NO. | : 11/700757 |
| DATED | : August 10, 2010 |
| INVENTOR(S) | : Isamu Hotta et al. |

It is certified that error appears in the above-identified patent and that said Letters Patent is hereby corrected as shown below:

On the title page, item [54] and column 1, line 1: the Title should read:

FUEL SUPPLY DEVICE FOR INTERNAL COMBUSTION ENGINE AND CONTROL METHOD THEREFOR

On the title page, item [22]: the Filing Date should read:

Filed: Feb. 1, 2007

Signed and Sealed this
Twenty-eighth Day of December, 2010

David J. Kappos
*Director of the United States Patent and Trademark Office*